Dec. 9, 1941.   M. C. OVERMAN   2,265,543
NONSKID TIRE
Filed Dec. 5, 1938   2 Sheets-Sheet 1

INVENTOR.
Max C. Overman
BY
John W. Hoag
ATTORNEY.

Dec. 9, 1941.    M. C. OVERMAN    2,265,543
NONSKID TIRE
Filed Dec. 5, 1938    2 Sheets-Sheet 2

INVENTOR.
Max C. Overman
BY
John W. Hoag.
ATTORNEY.

Patented Dec. 9, 1941

2,265,543

UNITED STATES PATENT OFFICE 2,265,543

NONSKID TIRE

Max C. Overman, New York, N. Y., assignor, by mesne assignments, to M. C. O. Corporation, New York, N. Y., a corporation of Delaware Application December 5, 1938, Serial No. 243,916

5 Claims. (Cl. 152—209)

This invention relates to tires and aims to provide a tire with improved tread.

Tire treads as heretofore suggested have not satisfactorily combined qualities of long wear, good traction, and ability to prevent skidding. Tire treads having one or more of these qualities have been deficient in one or both of the other desirable qualities. Thus for example tires for modern automobiles having a high anti-skid factor are formed with high, narrow and laterally collapsible circumferentially extending ribs, and are unsatisfactory due to the rapid wear and undesirable riding qualities which result from the ribs being collapsed laterally, first in one direction and then in the other.

An object of my invention is to provide a tire tread combining to a high degree long wear, good traction, and resistance to skidding.

Another object of my invention is to provide a tire tread combining high anti-skid and long wear qualities.

A further object of my invention is to provide a tire with high, laterally distortable ribs which are non-collapsible under loads for which the tire is intended.

Another object of my invention is to provide a tire having non-collapsible load bearing ribs and means cooperating with the said ribs upon lateral movement of the tire to facilitate the engagement of the ribs with the road surface.

A still further object of my invention is to provide a tire tread combining long wear with the ability to give increased traction under increased load.

In carrying out my invention I provide a tire with a number of spaced circumferentially extending load bearing ribs provided with lateral protuberances which extend respectively toward the next adjacent rib but do not functionally engage it except in the event of a severe lateral load when they act as braces between adjacent ribs, preventing undue lateral distortion or collapse of the ribs. Between the protuberances, in the spaces between adjacent ribs, I provide thin flexible partitions or webs, preferably lower than the ribs and lateral protuberances, but adapted to contact the surface of the road when the tire is under lateral load and thus provide a wiping action on the road surface at the inception of any skidding.

My improved tread structure has the advantage of long life, since the load bearing ribs are not subject to the high degree of wear which results when the ribs are collapsible laterally. The thin wiping webs aid in giving the tread high anti-skid quality, and this quality may be combined with good tractive quality by using serpentine circumferentially extending ribs preferably positioned so that their engagement with the road surface will be more or less proportioned to the load on the tire.

It will be understood that the embodiments of the invention disclosed herein are offered as illustrations of the invention and not by way of limitation, and that the number, size, and curvature of the load bearing ribs, of the voids between adjacent ribs, and of the wiper ribs, may be substantially varied according to the purpose for which the tire is designed, without departing from the scope of the invention.

My invention will best be understood if the following description is read in connection with the drawings, in which.

Figure 6:
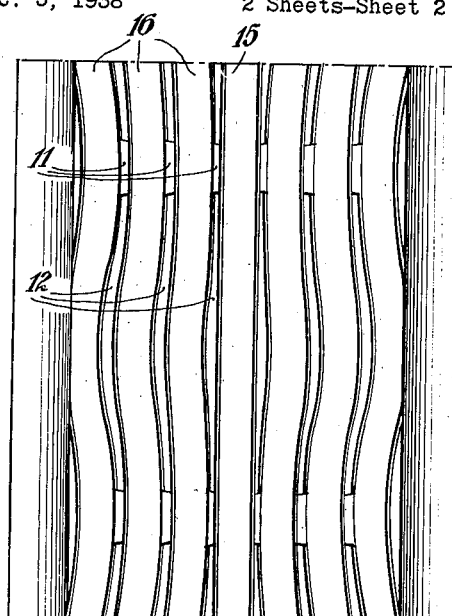
Figure 6 is a top plan view of a portion of a tread surface combining serpentine ribs with a straight central rib and showing voids between the ribs having portions of increased width.
Figure 7:
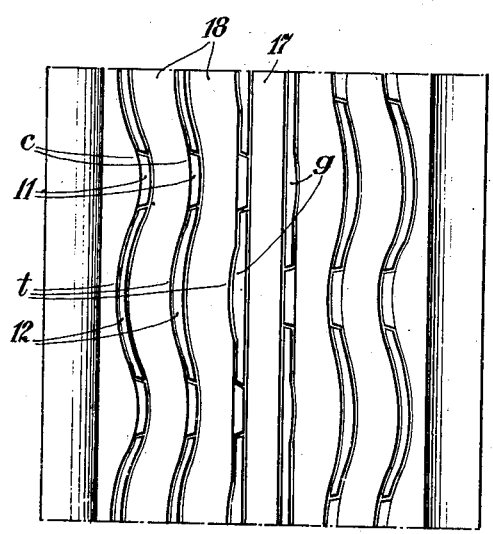
Figure 8:
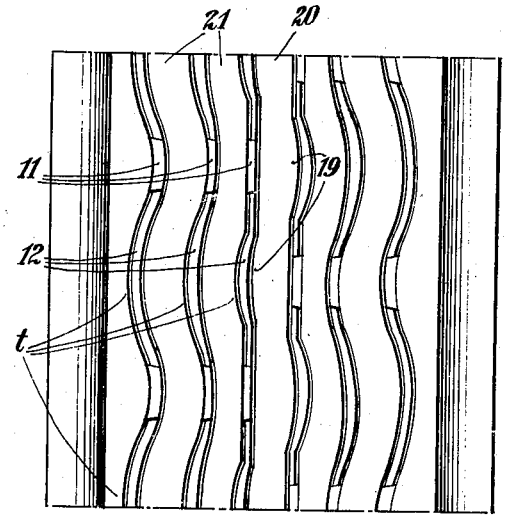

Figure 7 is a modification of the tread surface shown in Figure 6 utilizing a substantially straight sided central rib, and serpentine ribs, the degree of curvature of both the ribs and voids increasing progressively from the central rib outwardly; and Figure 8 is a modification of Figure 7 showing the wiper ribs integral with the lateral protuberances and showing the straight central rib having portions of increased width.

Figure 2:
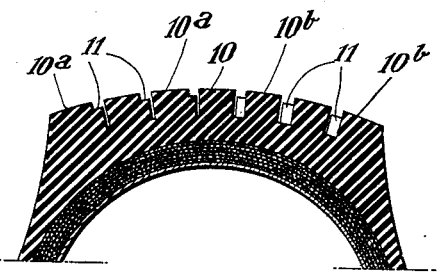
Figure 2 is a transverse section taken on the line 2—2 Figure 1.
Figure 1:
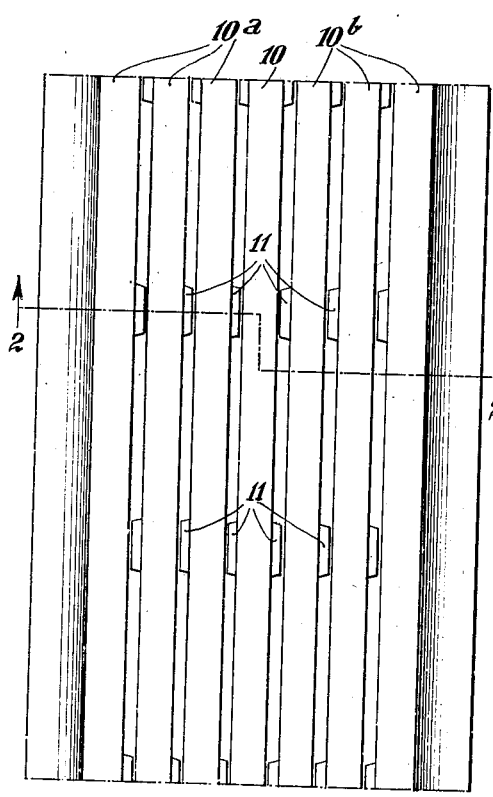
Figure 1 is a top plan view of a tread surface showing lateral protuberances which extend into the spaces between the ribs.

The tread shown in Figures 1 and 2 comprises a central circumferentially extending rib 10 and circumferentially extending ribs 10a and 10b arranged on either side of the central rib 10, each rib being spaced laterally from the adjacent rib. The ribs are provided with lateral protuberances 11 extending into the respective spaces between adjacent ribs, into proximity to the side wall of the next adjacent rib but somewhat spaced therefrom. As illustrated in Figure 1 the protuberances 11 are arranged directly opposite one another on central rib 10, but in staggered relation on ribs 10a and 10b adjacent to the central rib. On the ribs 10a and 10b, which are furthest removed from the central rib, protuberances are shown only on the inside of the rib, the outside of the rib merging into the side wall of the tire. The protuberances 11 preferably extend to the bottom of the spaces between adjacent ribs and somewhat below the outer surface of the ribs, as illustrated in Figures 2 and 4.

As illustrated in Figure 1 the circumferentially extending ribs are spaced $9/32$ of an inch apart and the lateral proturberances 11 extend outwardly from the main portion of the rib a distance of $5/32$ of an inch leaving a space of $1/32$ of an inch between the protuberance and the next adjoining rib. Each load bearing rib is accordingly free to distort laterally until one or more of the protuberances 11 abut against the side wall of the adjacent rib. When this occurs the protuberance acts as a buttress resisting further lateral distortion of the rib of which it is a part toward the next adjoining rib, or undue lateral distortion of the next adjoining rib toward the rib of which the protuberance is a part.

The width of the ribs, the spaces between the ribs, the size of the protuberances, and the space between each protuberance and the side wall of the next adjacent rib, as well as the position and distribution of the protuberances, may be varied according to the size of tire and the use for which it is intended.

Figure 4:
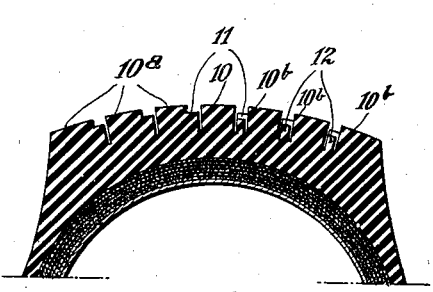
Figure 4 is a transverse section taken on line 4—4 of Figure 3.
Figure 3:
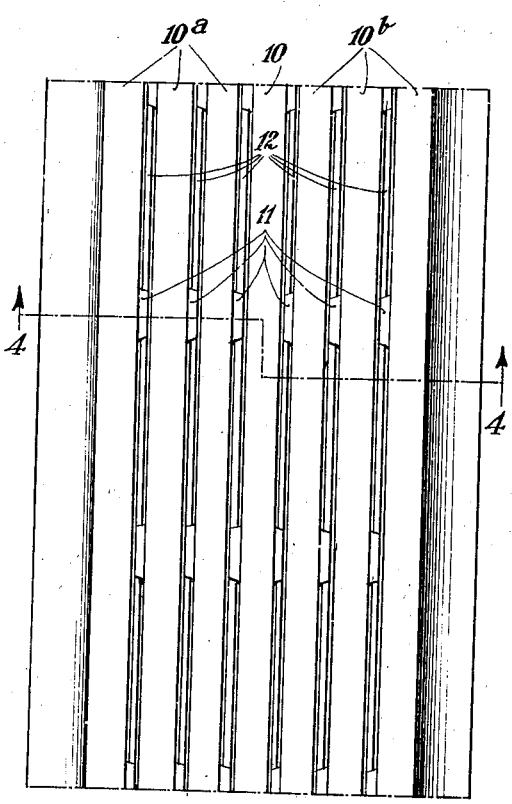
Figure 3 is a plan view of a portion of the tread surface showing the wiper webs between the protuberances in the voids between adjacent ribs.

In the embodiment of the invention shown in Figures 3 and 4, web members 12 are provided in the spaces between adjacent ribs, and are illustrated as formed integrally with the protuberances 11 but spaced from the side walls of the load supporting ribs. The web members 12 are thus free to bend and distort laterally and to wipe the road surface at the inception of any sidewise movement of the tire thus facilitating the engagement of the load bearing ribs 10, 10a, and 10b with the road surface to prevent skidding.

Figure 5:
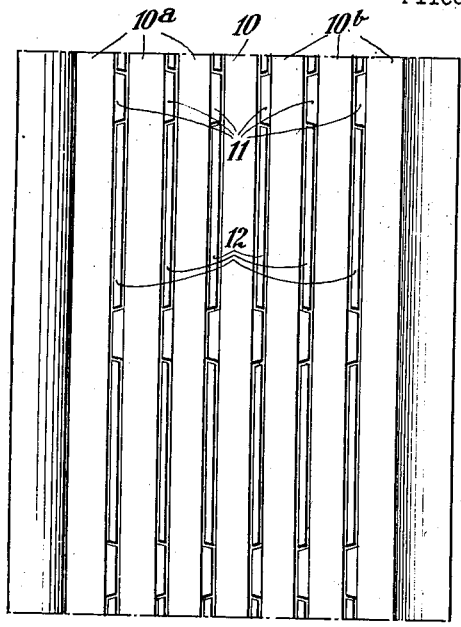
Figure 5 is a top plan view of a portion of the tread surface similar to Figure 3 but showing the wiper webs separated from the lateral protuberances.

In the modification of the tread surface shown in Figure 5 the thin wiper webs 12 are shown detached from the protuberances 11, for greater flexibility. The ends of the web members 12 will however serve as abutments limiting distortion of the protuberances 11 longitudinally of the tire.

In the modification of the tread surface shown in Figure 6 a straight circumferentially extending rib 15 is shown flanked by circumferentially extending serpentine ribs 16, which as illustrated are of uniform width. The voids between adjacent ribs are formed with enlarged portions to compensate gradually for the difference in contour between the central rib, and the flanking ribs. In the voids thin wiper webs 12 are provided, which as illustrated may be integral with the protuberances 11, and which preferably conform to the contour of the respective voids or spaces in which they are positioned.

In the modification of the tread shown in Figure 7 the central rib 17 is flanked by serpentine ribs 18. The side walls of the ribs with respect both to the other side wall of the same rib and the side walls of other ribs become progressively more serpentine away from the central rib. As illustrated the protuberances 11 are provided on the crest $c$ of the successive curves of the serpentine ribs but it will be apparent that they may be formed in the troughs $t$, or in any intermediate position. The spaces between the ribs may also comprise portions $g$ of greater width, and the wiper ribs 12, which as illustrated in this figure are detached from the protuberances 11, preferably conform substantially to the contour of the respective spaces in which they are positioned.

In Figure 8 enlarged portions 19 are provided in central rib 20 to aid in compensating for the difference in the contour between it and serpentine ribs 21, which, as in the case of Figure 7, are progressively increased in curvature in accordance with the distances from the central rib.

It will be apparent that the protuberances 11 serve to prevent the load supporting ribs from collapsing under severe load or lateral stress without lessening the ability of the load supporting ribs to be distorted laterally at the inception of any skidding action, and the thin wiper webs 12 facilitate the action of the circumferentially extending ribs in preventing skidding by exerting a wiping action on the road surface. It will of course be understood that in any embodiments of the invention the wiper webs 12 may be either formed integrally with the protuberances 11, or separately. In practice it is desirable from the point of view of simplification to form the webs integrally with the protuberances since it decreases the labor involved in cutting molds for the tread. The size of the tire and the load bearing ribs, the distance between protuberances and whether the tire is to be used on city pavements or for country driving are factors determining the degree of flexibility desired of the webs 12.

The wiping webs 12 have the further advantage that they tend to clear the grooves between the load supporting ribs, which are preferably nondraft in form, of mud, snow, sand, gravel or other material entering these spaces.

What I claim is:

1. A non-skid tire tread comprising circumferentially extending load supporting ribs spaced from one another laterally, and having at intervals around their entire length lateral protuberances approaching the adjacent load supporting rib, and thin wiper rib members positioned in the spaces between said load supporting ribs and intermediate the said protuberances thereon, said wiper ribs being narrower than said lateral protuberances.

2. A non-skid tire comprising a substantially parallel sided circumferentially extending central rib and serpentine circumferentially extending ribs on either side of said central rib, said serpentine ribs increasing in amplitude of curvature from said central rib toward the sides of the tread, and having lateral projections extending toward the next adjacent rib, said projections having extended lateral surfaces substantially parallel to the opposite lateral surfaces of said ribs, and being spaced around the ribs at intervals sufficiently short to resist undue distortion of the ribs throughout their length.

3. A non-skid tire comprising a substantially parallel sided circumferentially extending central rib, and serpentine circumferentially extending ribs on either side of said central rib, said ribs having at short intervals around their length lateral projections extending toward the next adjacent rib, and narrower wiper rib members located in the spaces between said previously mentioned ribs and intermediate the projections extending into said spaces, respectively, said projections being wider than said wiper rib members.

4. A non-skid tire comprising a central rib with portions of increased width, and serpentine ribs spaced at intervals on either side of said central rib formed so that the edges of the ribs are progressively more curved from the central rib outwardly, lateral protuberances at spaced intervals around said ribs extending into the space between adjoining ribs into close proximity to the adjoining rib, and thin wiper members intermediate adjoining ribs and between successive protuberances extending into the space between adjoining ribs, said protuberances being wider than said wiper members and being spaced sufficiently close around the length of the ribs to resist lateral distortion of the ribs throughout their length.

5. A non-skid tire tread comprising a plurality of substantially parallel sided and substantially sharp edged circumferentially extending load supporting ribs, of a height substantially equal to their width, spaced from one another laterally, and having at short intervals around their entire length lateral protuberances approaching the adjacent load supporting rib, and thin wiper rib members positioned in the spaces between said load supporting ribs and intermediate the said protuberances thereon, said wiper ribs being narrower than said lateral protuberances.

MAX C. OVERMAN.